US006836673B1

(12) United States Patent
Trott

(10) Patent No.: US 6,836,673 B1
(45) Date of Patent: Dec. 28, 2004

(54) MITIGATING GHOST SIGNAL INTERFERENCE IN ADAPTIVE ARRAY SYSTEMS

(75) Inventor: Mitchell D. Trott, Mountain View, CA (US)

(73) Assignee: ArrayComm, Inc., San Jose, CA (US)

( * ) Notice: Subject to any disclaimer, the term of this patent is extended or adjusted under 35 U.S.C. 154(b) by 605 days.

(21) Appl. No.: 09/746,678

(22) Filed: Dec. 22, 2000

(51) Int. Cl.[7] .................................................. H04B 1/38

(52) U.S. Cl. ..................... 455/562.1; 455/1; 455/67.11; 455/67.13; 455/501; 455/283; 455/284; 455/63.1

(58) Field of Search ....................... 455/1, 562.1, 67.11, 455/67.13, 67.3, 501, 114.2, 283, 284, 63.1, 63.4, 561

(56) References Cited

U.S. PATENT DOCUMENTS 5,465,410 A 11/1995 Hiben et al.
5,471,647 A * 11/1995 Gerlach et al. ............ 455/63.1
5,592,490 A 1/1997 Barratt et al.
6,236,839 B1 * 5/2001 Gu et al. ................. 455/67.14
6,564,036 B1 * 5/2003 Kasapi ........................... 455/1
2003/0032423 A1 * 2/2003 Boros et al. ................ 455/423
2003/0050016 A1 * 3/2003 Boros et al. ............... 455/67.4

FOREIGN PATENT DOCUMENTS

DE 198 03 188 A1 7/1999
WO WO 00/44114 7/2000

* cited by examiner

*Primary Examiner*—Lee Nguyen
*Assistant Examiner*—Minh D. Dao
(74) *Attorney, Agent, or Firm*—Blakely, Sokoloff, Taylor & Zafman, LLP

(57) ABSTRACT

A method and apparatus for mitigating co-channel and inter-channel interference in an antenna array system. It is determined by a base station or other transmitter employing an antenna array that transmission of at least a first downlink signal will generate a co-channel or inter-channel ghost signal at at least one location that may be susceptible to such ghost signal (e.g., as interference). As such, a weight to be applied to the at least first downlink signal is adjusted to reduce mitigate the undesirable effect of the ghost signal at the location before transmission of the at least first downlink signal.

32 Claims, 6 Drawing Sheets

MITIGATING GHOST SIGNAL INTERFERENCE IN ADAPTIVE ARRAY SYSTEMS

RELATED APPLICATIONS

The present invention is related to application Ser. No. 09/745,768, entitled, "METHOD AND APPARATUS FOR MIGRATING INTER-CHANNEL INTERFERENCE IN ADAPTIVE ARRAY SYSTEMS," by A. Kasapi et al., and filed on Dec. 22, 2000, and assigned to the assignee of the present invention.

FIELD OF THE INVENTION

The present invention relates to the field of wireless communications systems, and in particular, to a method and system for interference mitigation in adaptive array systems.

BACKGROUND OF THE INVENTION

One advance in increasing the capacity of communication systems has been in the area of resource sharing or multiple access. Examples of multiple access techniques include code division multiple access (CDMA), frequency division multiple access (FDMA), and time division multiple access (TDMA). For example, in a TDMA system, each remote user terminals communicates with a hub communication device (e.g., a base station) in a frequency channel shared with other remote user terminals, but in its own (i.e., non-overlapping) time slot. As such, in a TDMA system, multiple remote user terminals may communicate with the hub communication device within the same frequency channel, but within non-overlapping time slots. (The term "channel" as used herein refers to any one or a combination of conventional communication channels, such as frequency, time, code channels).

Unfortunately, communications systems, especially those employing multiple access techniques, may suffer from inter-channel interference (inter-channel interference is also sometimes referred to as adjacent channel interference; however, the term inter- channel interference is used herein to emphasize that interference may occur between channels that are not necessarily adjacent, but may nonetheless affect each other). For example, in an FDMA cellular communication systems, when a base station transmits a downlink signal to a first receiver (which may be a cellular telephone handset or other remote user terminal) on a primary frequency channel, a second receiver that is tuned to receive in a non-primary frequency channel, which channel may be adjacent to or relatively near the frequency band of the primary frequency channel, may nonetheless experience inter-channel interference due to transmitter, receiver, and/or channel characteristics or limitations that cause energy from the primary downlink signal to be detected as interference on one or more non-primary channels. Similarly, in a TDMA system, receivers operating in adjacent time slots may experience inter-channel interference. Nonetheless, this is currently employed in some systems, such as GSM system.

Inter-channel (and/or co-channel) interference experienced by receivers, such as remote user terminals, that are not the intended recipient of the "primary" transmission of a base station or other communication device may be caused by one or a combination of factors attributed to the limitation (s) of the receiver(s), the characteristics of the channel and/or environment, and/or by generation of "ghost" signals by the transmitter (e.g., by the base station). For example, factors that are attributed to limitations of a receiver, such as a remote user terminal, and which factors may cause inter-channel interference to occur include, but are not limited to, relatively limited dynamic range in the receive path of the remote user terminal, phase noise in the remote user terminal's oscillator, relatively poor analog and/or digital filtering or channel selectivity of the remote user terminal. On the other hand, factors attributed to a transmitter, such as a base station, may also cause inter-channel (and/or co-channel interference) that may be experienced by one or more receivers. For instance, a transmitter may generate unwanted "ghost signals" to appear on "primary" or "non-primary" channels when the transmitter transmits a downlink signal on the primary channel.

Unfortunately, techniques for alleviating inter-channel interference by improving the remote user terminal's selectivity—i.e., its ability to discard unwanted signals in nearby frequency, time, and/or code channels—generally entail additional cost or power consumption. On the other hand, relatively limited selectivity of a remote user terminal's receiver may cause a number of undesirable effects in a communications system. In fact, if adjacent channels are occupied by signals of sufficient power, the resultant interference to the remote user's receiver may render the remote user terminal relatively unreliable or even inoperable.

One technique to reduce or eliminate inter-channel inteference is to leave unoccupied (i.e., unused) adjacent channels and/or other relatively nearby channels that may be susceptible to (or cause) inter-channel interference. For example, if a remote user terminal in communication with a base station is using a given channel, the base station may be programmed not to assign adjacent or other relatively nearby channels to other remote user terminals whose relatively limited channel selectivity may render such adjacent or nearby channels susceptible to inter-channel interference. However, by leaving some otherwise usable channels unused, this solution leads to a relatively significant loss in spectral efficiency. In systems where there may be a relatively large number of remote user terminals, such a loss in spectral efficiency may render this solution impractical.

Another prior technique for reducing inter-channel interference involves dynamic channel allocation. One example of dynamic channel allocation is employed in the Personal Handyphone System (PHS), a cellular network architecture currently implemented in a number of geographical areas, including, for example, in portions of Japan. PHS remote user terminals (also known as PHS handsets) are capable of transmitting control messages to a PHS base station. When a PHS handset detects a deteriorated signal quality (e.g., due to inter-channel interference), the PHS handset informs the PHS base station, via a control message, that a new channel is needed, and such new channel may be allocated by the PHS base station to the PHS handset during a communication session (e.g., during a voice or data "call").

However, before a PHS handset accepts a newly assigned channel, the handset measures the interference on the newly assigned channel to determine whether it is significant relative to a threshold. When the PHS handset performs the measurement of interference on the newly assigned channel, the handset uses the same receiving apparatus that is used during normal traffic of voice or data exchange with the PHS base station. As such, even during the measurement phase for a newly assigned channel, the PHS handset may experience interference from signals on adjacent or nearby channels. If the level of such interference is too high, for example, as compared with a threshold, the PHS handset may again request a new channel from the base station.

Eventually, if network load—namely, the number of users (e.g., PHS handsets) or other signal sources or receivers—does not exceed a threshold, the PHS handsets and base stations in the PHS network may find a pattern of time slots and frequencies that facilitate communication with a tolerable amount of inter-channel interference. If, on the other hand, no suitable channel can be found by a PHS handset in a number of attempts or within a predefined time-period, a call may be dropped—i.e., communication may involuntarily be terminated between the PHS handset and the base station. Furthermore, even if communication is not terminated, voice quality or data integrity is typically significantly reduced when a PHS handset switches between channels.

Adaptive arrays (also known as "smart antennas"), which employ antenna arrays along with signal processing hardware and/or software, also have been utilized to decrease interference and improve performance in wireless communications. Antenna arrays typically include a number of antennas that are spatially separated and coupled to one or more digital signal processors and/or general purpose processors. Adaptive antenna arrays, or simply, adaptive arrays, periodically analyze the signals received from each of the antennas in an array to distinguish between desired signals (e.g., from a desired remote user terminal, such as cellular telephone or other communication device) and undesired signals (e.g., uplink signals of undesired remote user terminals in the same or different cell area), multipath, etc. Other types of antenna array systems, and in particular, switched beam antenna array systems, also may be employed, although such types of antenna array systems typically do not dynamically and adaptively vary their radiation pattern to mitigate interference, but are limited to a finite number of beamforming patterns.

The process of combining the signals of a number of antenna elements to enhance the gain at the location of a desired remote user terminal, while diminishing gain at the location of one or more other remote user terminals, is generally referred to as beamforming. A downlink weight is computed by the antenna array system for describing a downlink beamforming strategy that provides a suitable radiation pattern for transmission of signals from the antenna array system to a desired remote user terminal. Conversely, an uplink weight is determined by the antenna array system for describing an uplink beamforming strategy that provides a suitable radiation pattern for reception of signals by the antenna array system.

The weights are generally computed as a function of the spatial and/or temporal characteristics associated one or more remote user terminals, as may be determined, for example, by measurement of uplink signals received at the various antenna elements of the antenna array. For example, in some adaptive array systems, the direction-of-arrival (DOA) measurement performed by an adaptive array system may provide a spatial characteristic associated with an uplink signal, and thus, the source (i.e., the transmitter) of such uplink signal. However, other known spatial characteristics and methods for determining the same exist. As such, it should be appreciated that the description herein does not depend on, and as such, is not limited to, a particular type of spatial characteristic or spatial characteristic measurement technique.

FIG. 1 is a diagram depicting a simplified radiation pattern of one type of antenna array system, according to the prior art. In the system shown in FIG. 1, an antenna array 10 transmits (downlink) signals to and/or receives (uplink) signals from a desired (sometimes referred to as "primary") remote user terminal (RUT) 12, such as a mobile or stationary remote user terminal (e.g., a cellular voice and/or data communication device, a PDA having wireless capability, a modem or other wireless communication interface coupled to a mobile or stationary data processing device, etc.) on one or more "primary" channels. In accordance with known "smart antenna" or "adaptive array" processing techniques, the antenna array 10 may, depending on a number of factors, also simultaneously generate regions of interference mitigation (or "nulls") toward other RUTs. As such, in FIG. 1, the antenna array 10 generates an enhanced gain region 6 at the location of the desired RUT 12, while also generating a first region of relatively minimized gain or "null" region 2 at the location of an undesired RUT 14 and a second interference mitigated or "null" region 4 at the location of another undesired RUT 16.

The null regions 2 and 4 represent one of the advantages of adaptive arrays and "smart antenna" processing. In particular, each of the nulls 2 and 4 represent a represent a region of minimized gain, relative to the enhanced gain region 6. As such, the antenna array 10 typically, when transmitting to the desired RUT 12 on a primary channel also generates a null at one or more locations, where each location generally corresponds to the location of another RUT. By so doing, the antenna array 10 may mitigate the interference that one or more other RUTs experience when the antenna array 10 communicates with the desired RUT 12. As such, null generation may be viewed as a technique for providing interference mitigation, and each "null region" may be referred to as an interference mitigated region.

By enhancing the gain at the location of a desired remote user terminal, while diminishing the gain at the location of one or more other remote user terminals, the antenna array 10 may "spatially" receive and transmit signals, and as such, increase system capacity, decrease interference experienced by or caused by other remote user terminals, etc., by focusing transmission and/or reception gain at the location of a desired RUT, while diminishing transmission and/or reception gain at the location of one or more undesired RUTs.

It should be appreciated that the term "null" as used in the context of adaptive array systems does not typically mean a region of zero electromagnetic energy, since nulls may often include some level of gain, though typically less than an enhanced region. Furthermore, depending on various factors, including the power delivery constraints for the desired RUT, an adaptive array system may vary the "amount" of nulling by varying the number of nulls generated and/or varying the intensity/depth of nulls, such that the closer a null is to zero gain, the more intense or deep the null.

Unfortunately, adaptive arrays typically direct interference mitigation (or "nulling") toward an RUT occupying the same primary channel (e.g., time slot or carrier frequency slot) as a desired RUT. As such, the above-mentioned effects of inter-channel interference typically exist, even in adaptive array systems.

Thus, what is desired is a method and system for reducing inter-channel interference in a wireless system.

DETAILED DESCRIPTION

Figure 1:
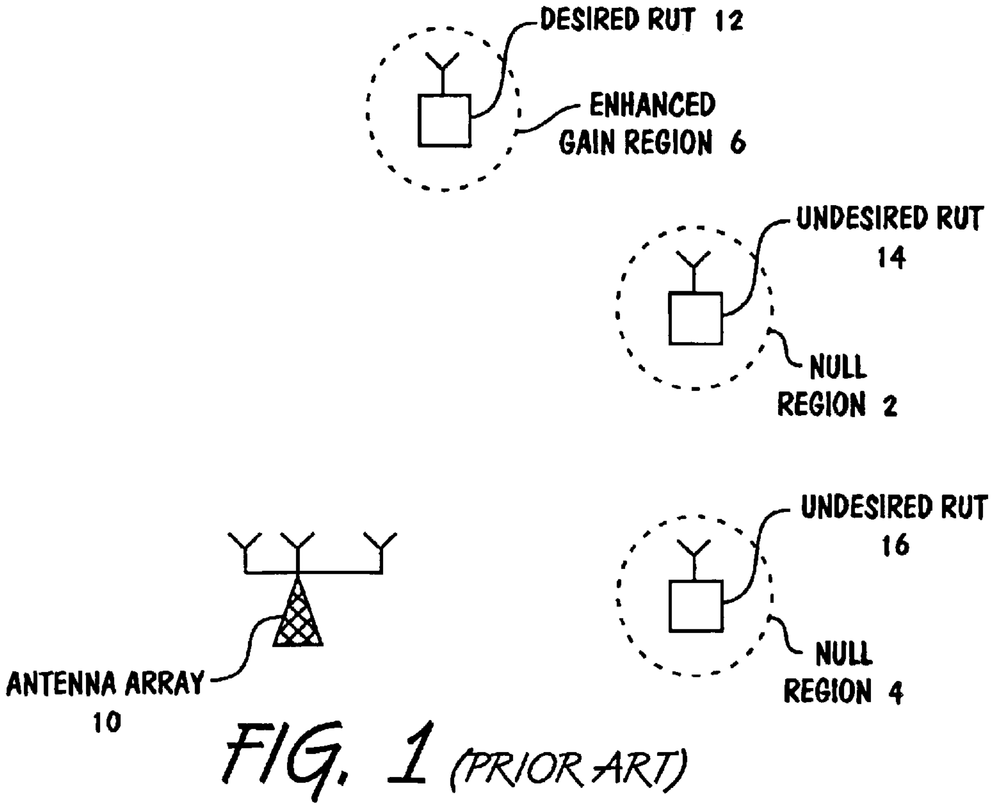
FIG. 1 (PRIOR ART)
FIG. 1 is a diagram depicting a simplified beamform pattern in one type of antenna array system, according to the prior art.
Figure 1B:
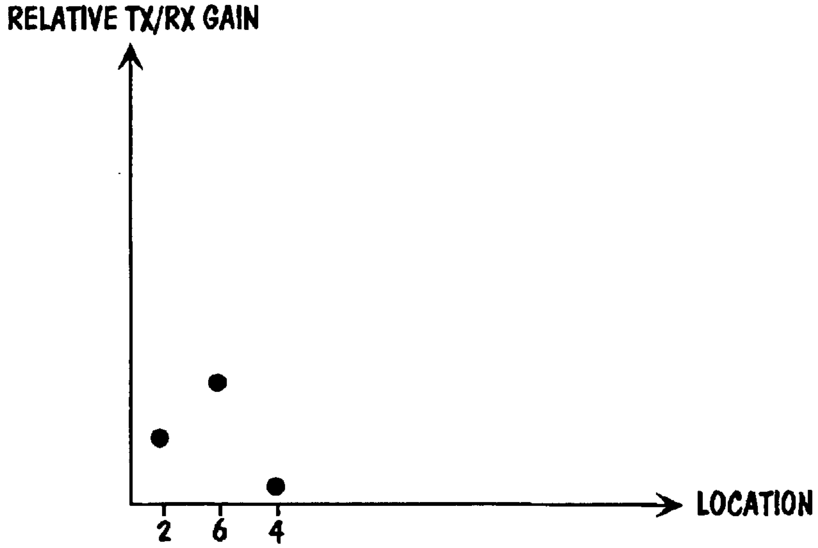
FIG. 1B (PRIOR ART)

The present invention provides a method and apparatus to diminish inter-channel and/or co-channel interference in a wireless communication system. The interference may be caused by the limitations of receivers and/or transmitters. According to a first aspect of the invention, inter-channel interference due to receiver (e.g., remote user terminal) limitations is mitigated by performing a novel method at a transmitter (e.g., base station). According to a second aspect of the invention, interference (which may be inter-channel or co-channel-related) to which one or remote user terminals may be susceptible, and which interference is caused by a transmitter (e.g., a base station) is mitigated by performing a novel method at the transmitter. Other novel features and benefits of the invention will be apparent from the description of several embodiments of the invention that follows.

It will appreciated that the invention may be utilized in various types of wireless architectures and applications, and thus is not limited to one type of wireless system or architecture. For instance, the invention may be utilized in time division duplex (TDD) or frequency division duplex (FDD) systems or other wireless architectures. The invention may also be utilized in an environment where multiple remote user terminals may be operating in substantially the same frequency, time, and/or code channel, but where each such remote user terminal is associated with a particular spatial channel. Furthermore, the invention may be employed in conjunction with TDMA, CDMA, and/or FDMA communication systems. It should further be appreciated that each or a combination of the various elements of the invention may be implemented in hardware, software, or a combination thereof.

As used herein, a base station differs from a remote user terminal, to the extent that a base station may process signals from multiple remote user terminals at the same time, and the base station is typically, but not necessarily, coupled to a network (e.g., the PSTN, the Internet, etc.). The invention is not limited, however, to any one type of wireless communication system or device. Although one embodiment of the invention is described with reference to a base station that includes an adaptive array, it should be appreciated that one or more remote user terminals may also include an antenna array. As such, the method and apparatus of the invention may also be embodied, at least in part, by a remote user terminal.

It should be appreciated that the term "widen" as used herein in connection with one or more filters, such as channel-select filter of a base station, is meant to cover any one or combination of filters that provide additional pass bands, and not necessarily a wider passband. As such, a "widened" channel-select filter, within the meaning of the present invention, may represent a channel-select filter with two or more passbands or two or more channel-select filters providing two or more passbands, etc.

Hardware Overview

Figure 2:
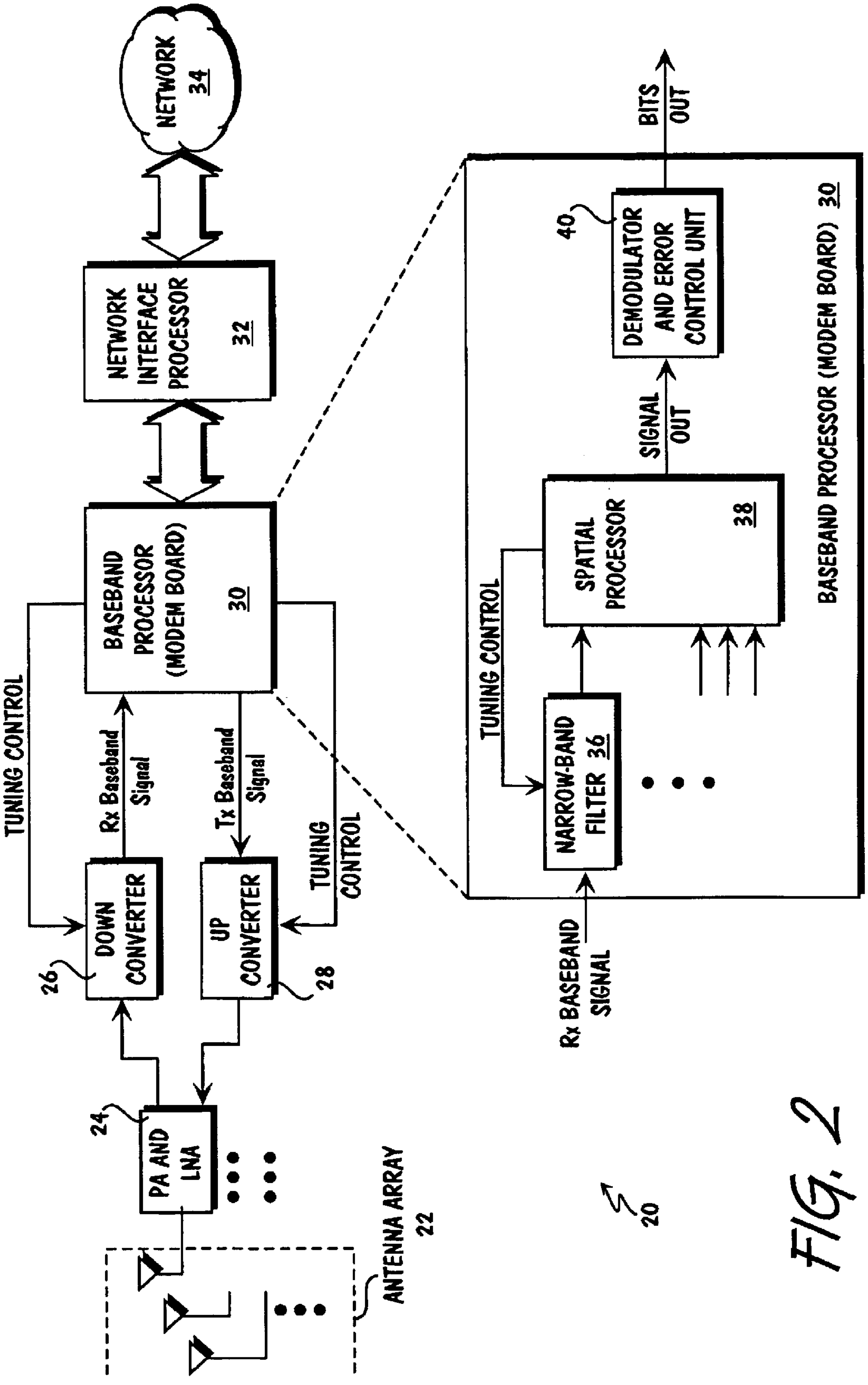
FIG. 2 is a block diagram of an adaptive array system employing an adaptive interference mitigation mechanism, according to one embodiment of the invention.

FIG. 2 is a block diagram of an adaptive array system employing an adaptive interference mitigation mechanism, according to one embodiment of the invention. As shown, a system 20, which may be part of a base station, in one embodiment, includes an antenna array 22, which in turn includes a number of antenna elements. The antenna array 22 is utilized for transmitting a downlink signal to a remote user terminal and for receiving an uplink signal from the remote user terminal. Of course, the system 20 may communicate with several remote user terminals, and as such, may process a number of signals each associated with a remote user terminal or other signal source. Furthermore, the system 20 may be employed in each of several base stations in a wireless communication network, where each base station uses a given set of channels to communicate with remote user terminal units within a given geographic region. Such remote user terminals may be stationary or mobile, and may communicate voice and/or data with the system 20.

As shown in FIG. 2, each antenna element of the antenna array 22 is coupled to a power amplifier (PA) and low-noise amplifier (LNA) 24. The PA/LNA 24 of each antenna element amplifies the received (uplink) and/or transmitted (downlink) signal. As shown, each PA/LNA 24 is coupled to a down-converter 26 and an up-converter 28. The down-converter 26 converts the "raw" signal received by the antenna array 22 on a carrier frequency into a receive (Rx) baseband signal, which is provided to a baseband processor (also referred to as a modem board) 30. The up-converter 28, conversely, converts a transmit (Tx) baseband signal provided by the baseband processor 30 into a carrier frequency transmit signal, which is provided to the PA/LNA 24 to be transmitted (e.g., to a remote user terminal). Although not shown, analog-to-digital conversion (ADC) and digital-to-analog (DAC) circuitry may be coupled between the down-converter 26 and the baseband processor 30 and between the up-converter 28 and the baseband processor 30, respectively.

The baseband processor 30 typically includes hardware (e.g., circuitry) and/or software (e.g., machine-executable code/instructions stored on a data storage medium/device) to facilitate processing of received (uplink) and transmitted (downlink) signals. In accordance with the embodiment of the invention shown in FIG. 2, the baseband processor 30 includes at least one narrow-band filter 36 filter received signals either in analog or digital form. The filtered signal from the narrow-band filter 36, in turn, is provided to a spatial processor 38.

The spatial processor 38 typically includes at least one general purpose processor and/or digital signal processor (DSP) to facilitate spatial or spatio-temporal processing. In one embodiment, the spatial processor 38, based on the spatial or spatio-temporal characteristic(s) (also known as a "spatial signature") of one or more uplink signals, is able to transmit and receive signals between one or more remote user terminals in a spatially selective manner. Accordingly, in one embodiment where spatial channels and SDMA is utilized, two or more remote user terminals may simultaneously receive and/or transmit on the same channel (e.g., carrier frequency and/or time slot and/or code) but may be distinguishable by the system 20 based on their unique spatial or spatio-temporal characteristic(s). However, in alternative embodiments of the invention, spatial channels may not be employed. One example of a spatial characteristic is direction of arrival (DOA) or angle of arrival (AOA). Other types of spatial characteristics known in the art of adaptive arrays may be employed in conjunction with the present invention.

In general, the antenna array 22 facilitates transfer of signals between the system and a desired remote user terminal and/or one or more other devices (e.g., a plurality of remote user terminals, other base stations in a wireless communication network, a satellite communication network, etc.). For example, the antenna array may transmit downlink signals to the desired remote user terminal, and receive uplink signals from the remote user terminal. Such transmission and reception may occur in the same frequency channel but at different times (e.g., in a TDD system) or may occur at different frequencies (e.g., in an FDD) system. The processor 38 determines the spatial characteristic(s) of the uplink signal from the desired remote user terminal, also referred to herein as a primary remote user terminal, as well as the spatial characteristic(s) of one or more other non-primary remote user terminals. Based on such characteristics, the system 20 determines a downlink beamforming strategy to enhance its transmission gain at the location of the desired remote user terminal, while relatively minimizing its transmission gain (i.e., providing a "null" or interference mitigated region) at the location of the non-primary remote user terminal(s). Similarly, the system 20, based on the spatial characteristics, may perform uplink beamforming to enhance its reception gain from the location of the primary remote user terminal, while minimizing its reception gain from the location(s) of one or more non-primary remote user terminals.

In one embodiment of the invention, the system 20 supports spatial channels, such that two or more remote user terminals in communication with the system 20 may simultaneously employ the same conventional frequency and/or time channel. In alternative embodiments, however, spatial channels may not be supported or utilized or may be utilized only when one or more conditions are met.

As shown in FIG. 2, the spatial processor 38 is further coupled to a demodulator and error control unit 40, which receives an "extracted" or "desired" signal or set of signals from the spatial processor 38, and outputs the extracted signal to a network processor 32. The unit 40 may perform error correction, provide packet overhead, and/or perform other processing before outputting the uplink information in the form of digital The network processor 32, which may or may not constitute part of the system 20, facilitates the transfer of information between the system 20 and an external network 34. Such information may include voice and/or data and may be transferred in a packet- switched or circuit-switched manner. For example, in one embodiment, a remote user terminal may include a cellular telephone, two-way pager, PDA with wireless communication capability, a wireless modem that may be interfaced to a data processing device, such as a laptop computer, PDA, gaming device or other computing device, or other communication device to facilitate routing voice and/or data signals between the remote user terminal(s) and the network 34, which in this example may include the public switched telephone network (PSTN), the Internet, and/or other voice and/or data network. Thus, the remote user terminal may include or be interfaced with a computing device (e.g., a portable digital assistant, a laptop/notebook computer, a computing cellular telephone handset, etc.), along with a Web-browser, in which case the network 34 may represent the Internet and the network interface processor may facilitate communication between the remote user terminal (via the system 20) and one or more servers or other data processing systems coupled to the Internet. As such, voice and/or data (e.g., video, audio, graphics, text, etc.) may be transferred between the system 20 (and one or several remote user terminals in communication therewith) and an external network 34.

Inter-Channel Interference Mitigation—Nulling Non-Primary Channel Users

In accordance with one aspect of the invention, the spatial characteristic(s) of one or more "non-primary" remote user terminals that may receive, and thus be susceptible to, energy on a non-primary (frequency, time and/or code) channel when the system 20 transmits to a primary remote user terminal on a primary channel is obtained. In one embodiment, such non-primary channels are adjacent to, or in proximity to, the primary channel.

In accordance with one aspect of the present invention, the spatial characteristic of the one or more non-primary remote user terminal(s) is utilized by the system 20 to generate an interference mitigated region (or null) at the location of the one or more such non-primary remote user terminals when the system 20 transmits a downlink signal to the primary remote user terminal on the primary channel. Thus, in one embodiment, to transmit a downlink signal to the primary remote user terminal on a primary channel, the system 20 determines a downlink beamforming strategy that provides an interference mitigated region at the location of one or more remote user terminals that use a non-primary channel for reception, which non-primary channel is nonetheless susceptible to carrying unwanted energy (i.e., interference) when the downlink signal is transmitted. As described below, such non-primary remote user terminals (or their spatial characteristic) may be identified in a number of ways, such as by measuring uplink signals received therefrom by the system 20, or from a data base that stores spatial characteristics of one or more remote user terminals that may utilize such non-primary channel(s), etc. Still other mechanisms may be utilized in alternative embodiments to obtain the spatial characteristics of one or more remote user terminals that use a non-primary time, frequency, and/or code channel that is adjacent or in proximity to the primary channel used by the system 20 to transmit a downlink signal to the primary remote user terminal.

In the present description, it should be appreciated that the system 20 may transmit a signal "to" the primary remote user terminal in a number of ways. For example, the transmission "to" a particular remote user terminal(s) may be spatially directed to one or more locations (e.g., using a smart antenna spatial processing technique). The transmission, on the other hand, may not necessarily be directional/spatial, but may be non-directional, omni-directional, sectorized, or otherwise performed with or without spatial processing.

The spatial characteristic(s) of the one or more non-primary remote user terminals may be determined in a number of ways in various embodiments of the invention. For example, in one embodiment of the invention, one or more components of the system 20 may be controlled to detect signal energy on non-primary channels when the system 20 receives one or more uplink signals. By determining that one or more non-primary channels that are adjacent to or in proximity to the primary channel are utilized by one or more non-primary remote user terminals, the system 20 may obtain the spatial characteristic(s) of such non-primary remote user terminal(s) and as a function of the spatial characteristic(s), determine a downlink beamforming strategy that generates a null at the location of such non-primary remote user terminals when transmitting a downlink signal to a primary remote user on a primary channel.

For example, in the embodiment shown in FIG. 2, the baseband processor 30 includes tuning control for the down converter 26 and the up converter 28. Such tuning control allows the baseband processor, in one embodiment of the invention, to "widen" the uplink and/or downlink channel selection and/or filtering mechanism(s) of the system to detect, during uplink communication, energy on one or more non-primary frequency channels in proximity to, or adjacent to, the primary frequency channel used to communicate with a primary remote user terminal. The system 20 may then, during downlink transmission to a primary remote user terminal on the primary channel, generate one or more nulls, each at the location of at one or more non-primary remote user terminals that are each tuned to receive on one of the non-primary frequency channels.

Similarly, the spatial processor 38 may provide tuning control vis-à-vis the narrow-band filter 36 to alter the channel selectivity of the system 20 in order to facilitate identifying one or more spatial characteristics of non-primary remote user terminals that may transmit and/or receive on non-primary channels adjacent, or in proximity, to the primary channel. In doing so, the system 20 may generate a null in the direction of one or more such non-primary remote user terminals when transmitting to a primary remote user terminal on the primary channel.

While one embodiment is described with reference to detection of energy in non- primary frequency channels, alternative embodiments may detect energy in non-primary time slots or code channels in lieu of or in addition to detecting energy in non-primary frequency channels. For example, in an alternative embodiment, a time-gating circuit of the system 20 may be widened to detect energy in a time slot other than the primary time slot. In yet another embodiment, one or more non-primary code channels may be monitored to detect energy.

It should be emphasized that the invention may be utilized in various types of systems and applications utilizing antenna arrays, and in particular, adaptive array (or smart antenna) systems wherein beamforming strategy is dynamically determined based on a changing signal and interference environment. In one embodiment, the invention is employed in a Personal Handyphone System (PHS) base station employing an adaptive array.

In a PHS system, a downlink weight is computed by solving the (regularized) least-squares problem based on measurements of an uplink covariance matrix. In other words, downlink weights are determined as a function of measured uplink signals. As such, in one embodiment of the invention as utilized in a PHS base station, the uplink covariance matrix corresponding to an uplink signal on a primary channel is modified by adding a scaled version of a covariance matrix corresponding to energy on one or more other/non-primary channels (e.g., on nearby or adjacent channels) received by the base station. In an alternative embodiment, a received uplink signal is modified by the base station before a covariance matrix is computed, by adding a scaled version of the received uplink energy received on non-primary channels (e.g., on nearby or adjacent channels). In one embodiment, this is performed by widening a digital frequency channel-select filter, time gate, or other channelization mechanism of the base station to detect the uplink energy present on one or more non-primary channels.

For example, in one embodiment, the base station computes a first uplink covariance matrix corresponding to an uplink transmission of the primary remote user terminal on a primary channel, which uplink transmission is received by the base station. The base station then adds a second uplink covariance matrix, corresponding to a scaled version of energy detected on a second channel to the first uplink covariance matrix to form a third covariance matrix. In one embodiment, the energy is caused at least in part by an uplink transmission of another non-primary remote user terminal. Based on the third covariance matrix, the base station computes a downlink weight, and thus, determines a downlink beamforming strategy, for transmitting to a downlink signal intended for the primary remote user terminal, wherein the downlink weight mitigates energy on the second channel.

In another embodiment, the received uplink signals on the primary channel and at least one non-primary channel (e.g., a channel adjacent to the primary channel) are combined prior to computing a covariance matrix. As such, the base station in this embodiment adds a signal received from a non-primary remote user terminal on a non-primary channel to the uplink signal received by the primary remote user terminal on the primary channel to form a combined signal. The base station then computes a covariance matrix for the combined signal, and obtains a downlink beamforming strategy as a function of the covariance matrix to generate a null at a location corresponding to the non-primary remote user terminal. In one embodiment, this is performed by widening the channel select mechanism (e.g., frequency channel filter, time-gating filter) of the base station.

Techniques that may be utilized by the present invention for determining a downlink beamforming strategy based on measurement of one or more uplink signals are generally known. For example, techniques for obtaining a downlink beamforming strategy that are utilized in one embodiment of the invention are described in U.S. Pat. No. 6,141,567 entitled, "APPARATUS AND METHOD FOR BEAMFORMING IN A CHANGING-INTERFERENCE ENVIRONMENT," Ser. No. 09/327,776, issued Oct. 31, 2000 to Youssefmir et al., and assigned to the assignee of the present invention, which is hereby incorporated herein by reference. However, it should be appreciated that the particular technique for determining a downlink weight, and corresponding beamforming strategy, is not essential to an understanding of the present invention. As such, various techniques for determining a downlink weight, an in general, a downlink beamforming strategy, based on uplink information may be employed in the various embodiments of the present invention.

In one embodiment, downlink beamforming is performed in conjunction with calibration, using known techniques, for example, such as ones described in U.S. Pat. No. 6,037,898, entitled, "METHOD AND APPARATUS FOR CALIBRATING RADIO FREQUENCY BASE STATIONS USING ANTENNA ARRAYS," which is assigned to the assignee of the present invention.

Once detected, a weight is determined as a function of the spatial locations of one or more non-primary remote user terminals that transmitted the energy on non-primary channels. The weight computed as a function of the energy on non-primary channels is utilized by the base station to generate a null at the one or more spatial locations of the one or more non-primary remote user terminals when the base station transmits a signal to a primary remote user terminal on the primary channel. As such, the inter-channel interference experienced by non-primary remote user terminals tuned to the non-primary channel(s) may be diminished.

In some instances, such as in a PHS system, widening the channel-select filter of the base station may slightly degrade the adjacent channel selectivity of the base station, because the output of the channel-select filter may be used both for demodulation and also to determine downlink (transmit) weights. If the invention is employed in a system wherein selectivity limitations are mainly limited to remote user terminals, then the degradation of the adjacent channel selectivity of the base station may be tolerated, especially since uplink spatial processing will tend to automatically reject unwanted signals (i.e., the energy on non-primary channels).

Thus, in one embodiment, to prevent intolerable degradation of the base station's channel selectivity, in lieu of or in conjunction with widening a base station's uplink channel-select filter to detect and then null nearby or adjacent channel interference, it may be preferable to alter the channel-select filter in some other manner. In one embodiment of the invention employed in a PHS base station that performs T/8 fractional symbol-rate sampling, temporal filtering is applied after uplink weight application, but prior to demodulation. Because such temporal filtering is applied to a single data stream, rather than to all antennae, it is not computationally prohibitive in many systems. As described below, an aliasing, in accordance with one aspect of the invention, may be employed.

Inter-Channel Interference Mitigation—Aliasing

In another embodiment, the uplink channel-select filter of a base station outputs a portion of the non-primary (e.g., adjacent) channel energy in a manner that aliases into or near the frequency band containing the waveform corresponding to the primary channel to allow further filtering/processing to mitigate its effects.

In one embodiment, T/1.5 sampling (or some other sampling rate in other embodiments) and filtering may be sufficient to mitigate the effects of the adjacent channel energy. In some digital communications system, however, baseband processing may involve a sampling rate that may cause a non-primary channel signal(s), such as energy on a channel adjacent to the primary channel, to alias into the primary channel utilized for transmission and/or reception by the primary remote user terminal.

In one embodiment of the invention, the uplink channel select filter of a base station allows an aliased component of the non-primary channel energy/signal to fall near the band edge of the signal present on the primary channel and sufficiently in proximity to the center frequency of the primary channel to allow spatial processing to measure its effects, but far enough from the center frequency to allow the non-primary channel energy to be substantially rejected by subsequent processing.

FIGS. 3 and 4 illustrate a method for mitigating inter-channel interference using aliasing, in accordance with one embodiment of the present invention as employed in a PHS system. It should be appreciated, however, that the invention is not limited to the PHS or any other particular wireless system or application and therefore may be modified for use in various types of wireless systems and applications.

In the PHS implementation shown, baseband processing is employed with a sampling rate of 1.5 samples per symbol. The PHS symbol rate is 192,000 symbols per second. The pulse shape of a PHS signal has 50% excess bandwidth, and PHS channels are spaced 300 kHz apart.

Figure 3A:
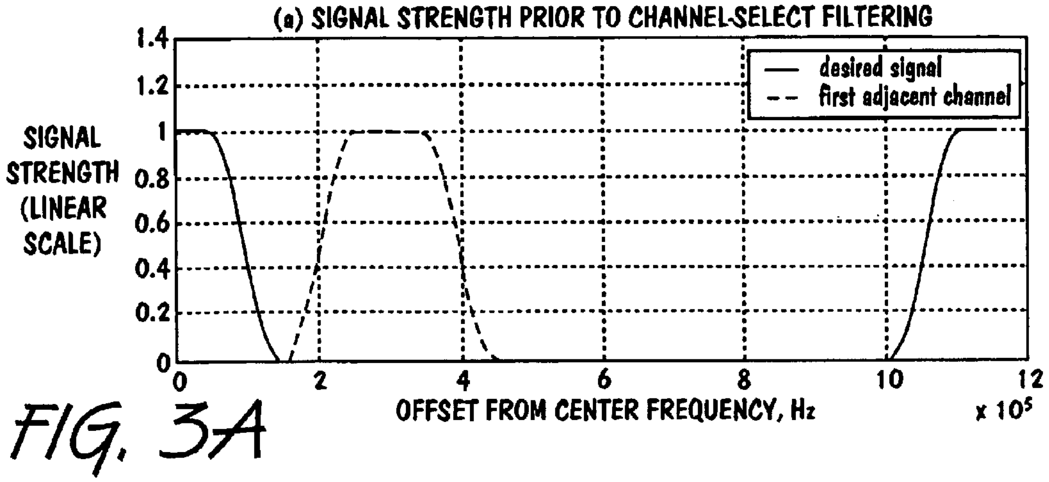
FIG. 3A illustrates a desired signal on a primary channel and an interfering signal on an adjacent channel, according to one embodiment of the invention employed in a PHS system.

FIG. 3A illustrates the desired signal (i.e., the signal on the primary channel) and the first adjacent channel signals (i.e., the non-primary channel signal(s)), sampled at a rate of 1152 kHz.

Figure 3B:
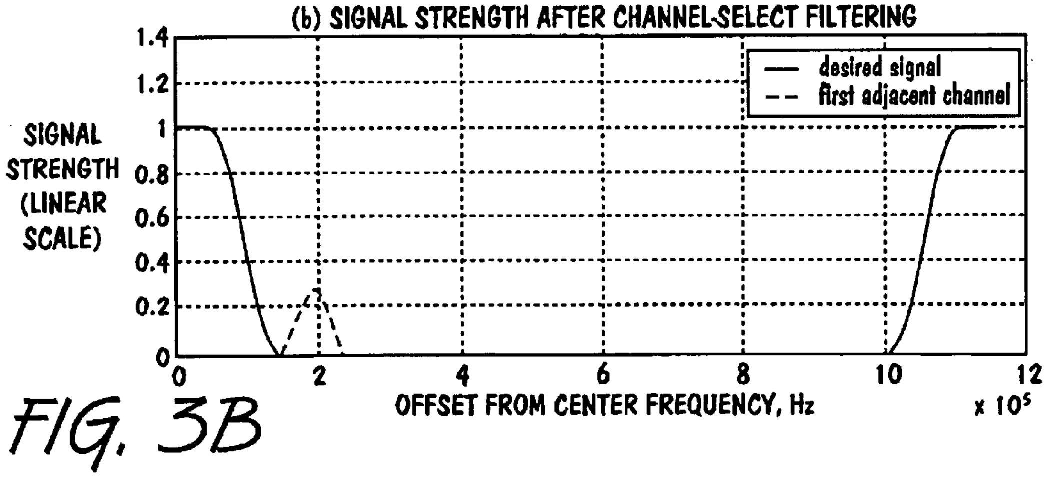
FIG. 3B depicts the residual adjacent-channel signal after a widened channel- select filter is applied to the situation shown in FIG. 3A.

FIG. 3B depicts the residual adjacent-channel signal after a widened channel- select filter is applied to the situation shown in FIG. 3A. As shown, a relatively low-frequency portion of the first adjacent channel signal remains subsequent to filtering.

Figure 3C:
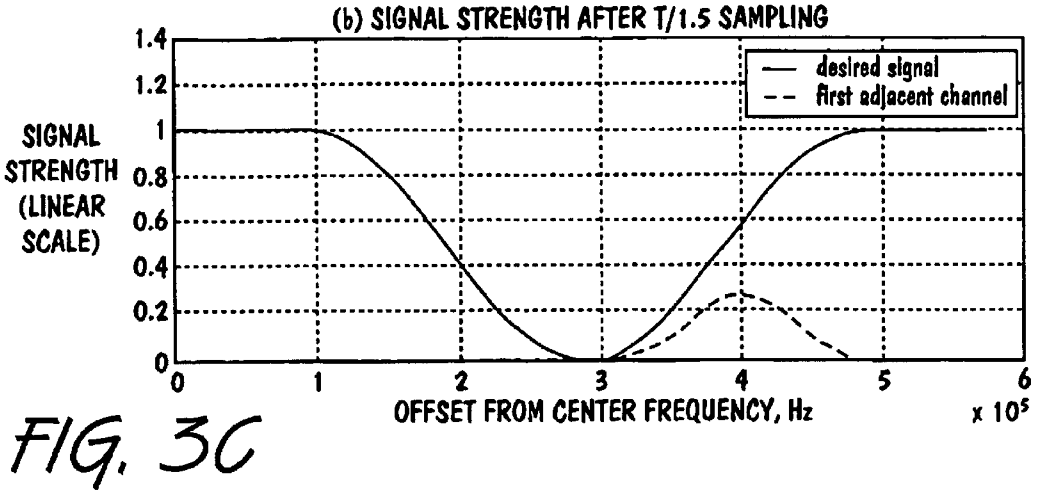
FIG. 3C depicts the baseband signal after decimation.

FIG. 3C depicts the baseband signal after decimation to a sampling rate of 288 KHz. As shown, the first adjacent channel signal (which may correspond to a remote user terminal not on the primary channel) has aliased into the signal of the desired remote user terminal in a manner that may be difficult, in some systems, to remove via subsequent filtering.

Figure 4A:
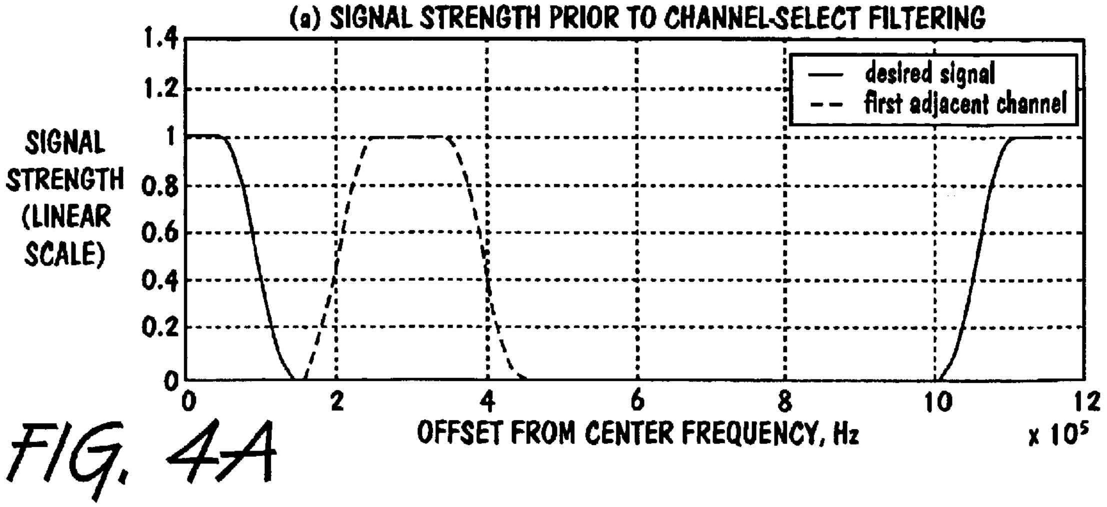
FIG. 4A illustrates a desired signal on a primary channel and an interfering signal on an adjacent channel, according to one embodiment of the invention employed in a PHS system.
Figure 4B:
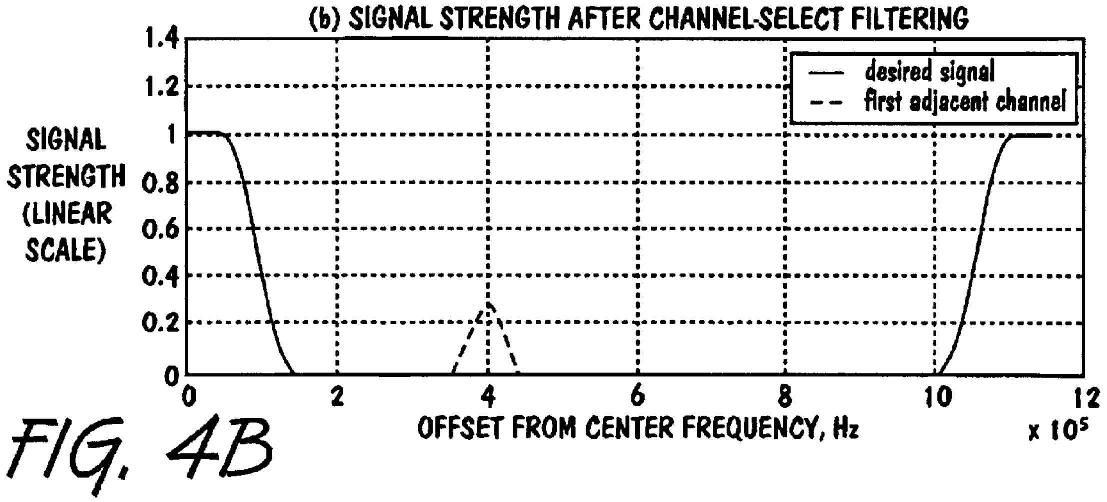
FIG. 4B, however, depicts the residual adjacent channel signal after a modified channel-select filter is applied.
Figure 4C:
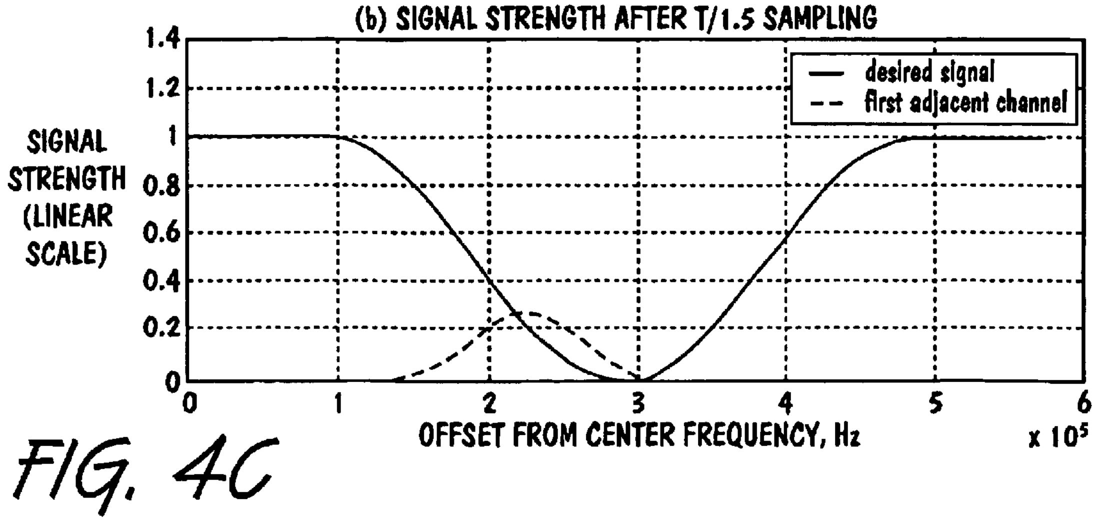
FIG. 4C depicts the desired signal and the adjacent channel signal after decimation.

As such, FIGS. 4A–4C illustrate an improved method for mitigating adjacent- channel interference through aliasing, in accordance with one embodiment of the invention. FIG. 4A, like FIG. 3A, illustrates the desired signal (i.e., the signal on the primary channel) and the first adjacent channel signals (i.e., the non-primary channel signal(s)), sampled at a rate of 1152 kHz.

FIG. 4B, however, depicts the residual adjacent channel signal after a modified channel-select filter is applied. In contrast with FIG. 3B, the modified channel-select filter outputs a relatively small, high-frequency portion of the adjacent channel signal. As explained below, by modifying the channel select filter to do this (e.g., by using known filter design techniques that provide two or more passbands), the adjacent channel signal can be removed in a relatively efficient manner by subsequent filtering.

FIG. 4C depicts the desired signal and the adjacent channel signal (the inter- channel interference) after decimation to a sampling rate of 288 kHz. As shown, the aliased adjacent channel signal occupies a portion of the spectrum where the strength of the desired signal is relatively small. As such, it is relatively easier to remote the adjacent channel signal using subsequent filtering.

In one embodiment, downlink weights for communicating with a desired remote user terminal on a primary channel while providing a null at one or more other remote user terminals that are tuned to receive on non-primary (e.g., adjacent or nearby) channels are computed based on non-primary channel energy detected by the base station when it receives uplink signals. In alternative embodiments, one or more remote user terminals, other base stations, and/or network equipment may provide information to the base station to inform the base station about non-primary channel remote user terminals. From such information, the base station may determine that a first remote user terminal tuned to a first (time, frequency, and/or code) channel may be affected when the base station transmits to a second remote user terminal that is tuned to a second channel. As such, the base station, when transmitting to the second remote user terminal on the second channel, will generate a downlink weight, and thus, a downlink beamforming strategy, that provides a null at the location of the first remote user terminal. The first and second channels, for example, may be frequency bands or time slots that are adjacent to or in proximity to one another.

Figure 5:
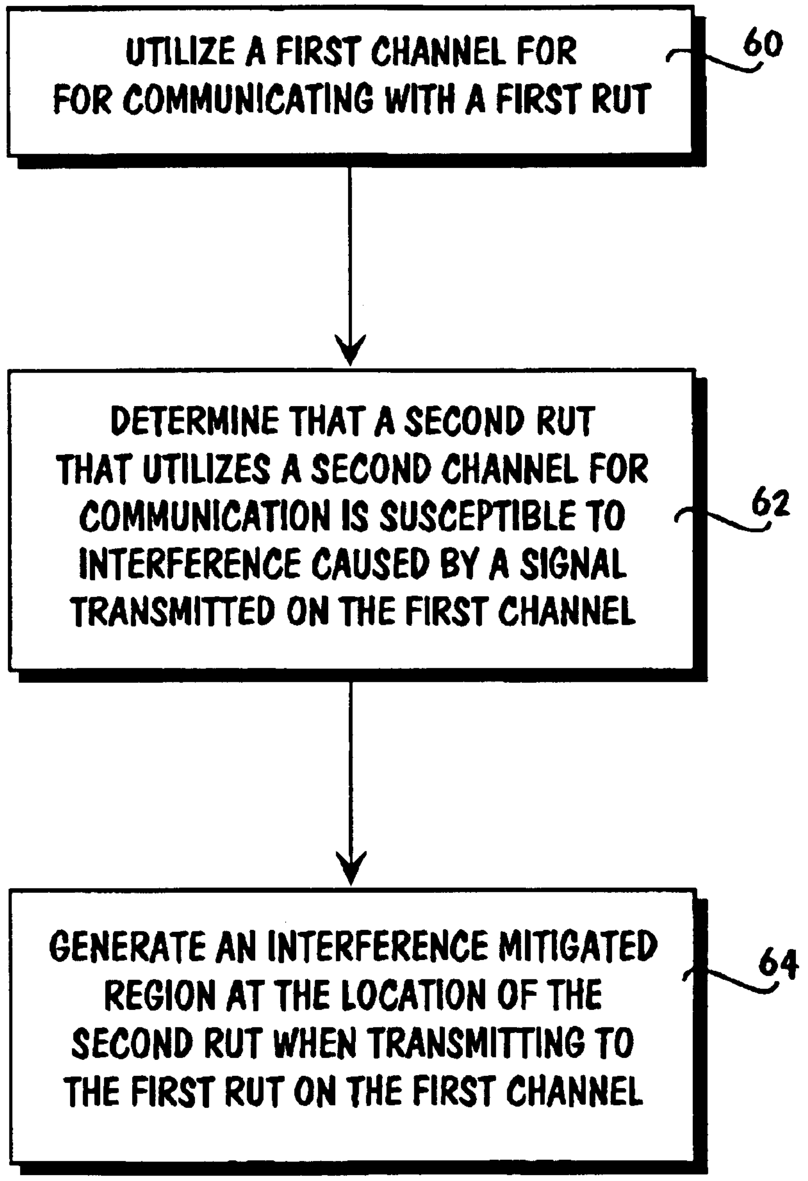
FIG. 5 is a diagram of a method for reducing inter-channel interference in an antenna array system, according to one embodiment of the invention.

FIG. 5 is a diagram of a method for reducing inter-channel interference in an antenna array system, according to one embodiment of the invention.

At block 60, a first channel is utilized by for communicating with a first remote user terminal (RUT). For instance, a base station and a first remote user terminal may utilize a first channel, such as a particular time, frequency, or code channel for communication (i.e., transfer of signals, such as downlink and/or uplink signals).

At block 62, it is determined, for example using one of the methods described above, that a second RUT that utilizes a second channel for communication (with the base station or another entity, such as another base station.) is susceptible to interference caused by the transmission of signals on the first channel. For example, the second RUT may detect energy due to a downlink transmission on the first channel to the first RUT, even though the second RUT is “tuned” to the second channel.

At block 64, an interference mitigated region is provided at the location of the second RUT when transmitting a signal, such as a downlink signal, to the first RUT on the first channel.

Transmitter “Ghost Signal” Mitigation

As described above, a transmitter (e.g., the transmitter of a base station) may, in accordance with one or more aspects of the present invention, be modified to reduce or otherwise compensate for inter-channel interference that be attributed to limitations of one or more receivers (e.g., remote user terminals). In accordance with another aspect of the invention, inter-channel or co-channel interference attributed to the transmitter itself may be mitigated by a method performed by the transmitter. In particular, “ghost signals” caused by a transmitter (e.g., a base station having an adaptive array) are mitigated in accordance with one aspect of the invention.

Ghost signals, as used herein, refer to unwanted inter-channel and/or co-channel signals that are transmitted by a transmitter along with a downlink signal transmitted by the transmitter. Such ghost signals may be caused, for example, by relatively strong signals transmitted by the transmitter and/or non-linearity characteristics of the transmitter and/or the particular beamforming strategy utilized by the base station. For example, a ghost signal may be caused at least in part by a transmit filter, in which case the ghost signal may have an effective weight that is equivalent or substantially equivalent to the weight of the primary signal.

In one embodiment, a spatial characteristic of the ghost signal(s) is determined by a communication device that includes an adaptive array, and the communication determines a downlink beamforming strategy as a function of the spatial characteristic of the ghost signal(s) such that the downlink beamforming strategy mitigates the ghost signal. Such "ghost signal mitigation" may be performed in one embodiment by providing nulls at the locations of one or more remote user terminals that may receive the ghost signal.

As mentioned, ghost signals may result from several factors related to a transmitter. For example, in certain situations, when one or more relatively strong signals are transmitted by a communication device, such as an adaptive array base station, intermodulation effects may cause ghost downlink signals to appear on the primary channel and/or one or more other (i.e., non-primary) channels. As such, in one embodiment of the invention, the effective transmit weight of the ghost signal(s) is determined (e.g., based on the non-linearity characteristic of the transmitter amplifier (s), as obtained, for example, from measurements, manufacturer specifications, and/or calibration). Using the effective transmit weight of the ghost signals, the downlink weight used to transmit to a desired remote user terminal is modified such that the ghost signal is nulled at the location of one or more remote user terminals (which may include the desired remote user terminal) that may otherwise have experienced interference due to the ghost signal(s).

In one embodiment, a transmitter that employs an antenna array (e.g., an adaptive array base station or other wireless communication device) determines that transmission of at least one downlink signal by the transmitter will result in ghost signal interference at the location of at least one remote user terminal. As such, prior to transmitting the at least one downlink signal, the transmitter adjusts a downlink weight corresponding to the downlink signal such that the ghost signal will be mitigated at that location. Then, the transmitter may transmit the downlink signal with the adjusted downlink weight applied thereto, thus mitigating the effect(s) of the ghost at the location of the at least one remote user terminal. In one embodiment, one or more other remote user terminals (which may be co-channel, inter-channel, or adjacent channel users) may also be identified by the base station as being susceptible to ghost signal interference. As such, the transmitter may also mitigate the ghost signal at their locations. This embodiment is illustrated by FIG. 6.

Figure 6:
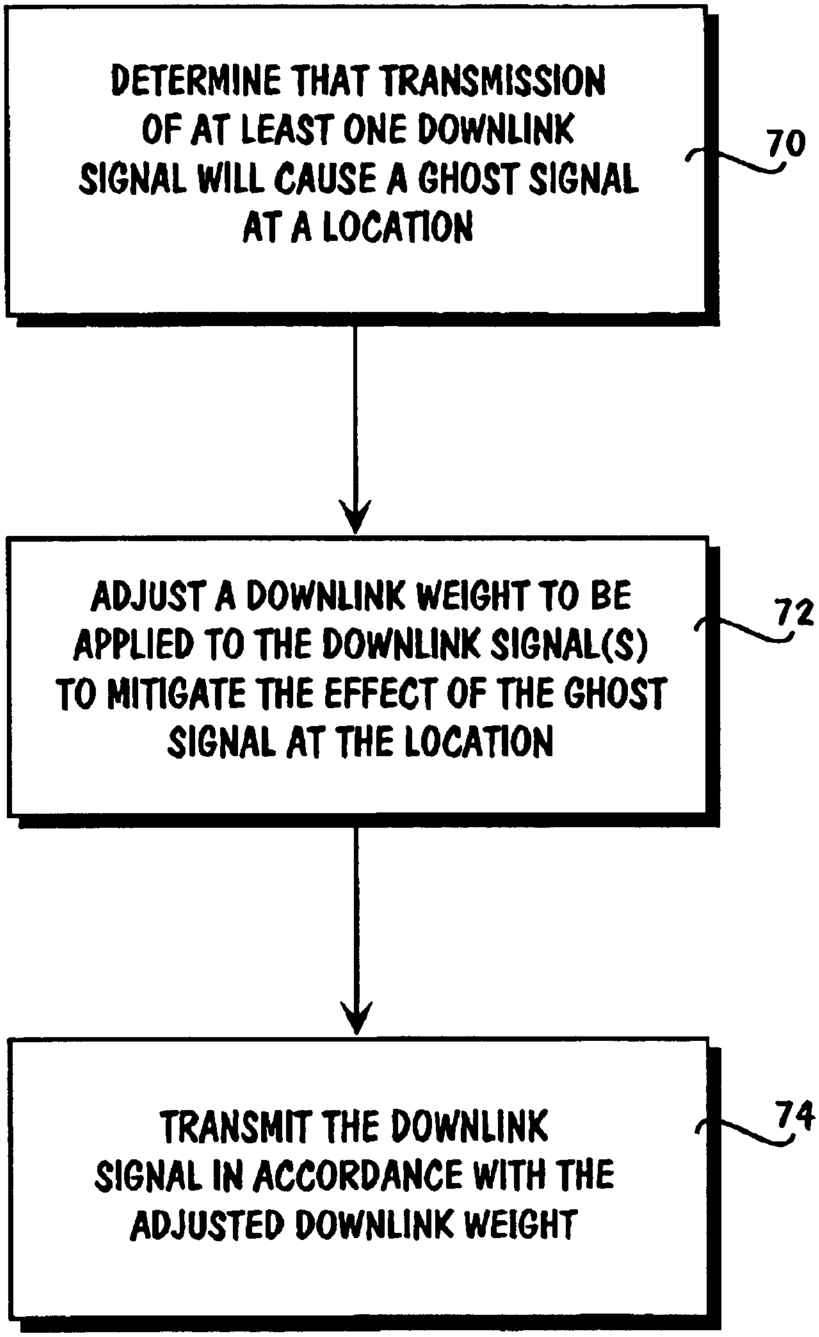
FIG. 6 is a diagram of a method for mitigating the undesirable effects of transmitter-related ghost signals, in accordance with one embodiment of the invention.

FIG. 6 is a diagram of a method for mitigating the undesirable effects of transmitter-related ghost signals, in accordance with one embodiment of the invention. At block 70, an antenna array system (e.g., a base station employing an adaptive array, in one embodiment) determines that transmission of at least one downlink signal will cause a ghost signal at a location. The location may correspond to a remote user terminal, for example, that is to receive the at least one downlink signal, or the location may correspond to another remote user terminal that is tuned to the same or a different channel on which the at least one downlink signal to be transmitted.

At block 72, a downlink weight corresponding to the downlink signal is adjusted to reduce the effect that the ghost signal would have had at the location.

At block 74, the downlink signal is transmitted in accordance with the adjusted downlink weight, thereby mitigating or effectively eliminating the effects that a ghost signal would have had at at least one location.

In one embodiment, the transmitter, which includes an adaptive array, transmits two signals, wherein a particular weight is applied to each signal. In determining at least one of the weights, adaptive array (e.g., the system 20) adjusts such weight to account for and mitigate a ghost signal that would be produced by the interaction of the two signals if transmitted by the adaptive array. The weight may be adjusted by way of direct calculation, as described in accordance with one embodiment below, or in an iterative manner. In one embodiment, the two signals may occupy the same channel. In another embodiment, the two signals may occupy different channels.

In one embodiment of the invention, the non-linearity of a transmitter power- amplifier is modeled by the cubic expression $$z\ell_{out}(t)=z\ell in(t)+b\ell^3\ell_{in}(t),$$

where $z\ell_{in}(t)$ denotes the input to the $\ell$th power amplifier of the base station transmitter;

$z\ell_{out}(t)$ denotes the corresponding output of the $\ell$th power amplifier of the base station transmitter; and $b=[b_1 b_2 \ldots b_M]$ is a vector of constants that may be measured during manufacturing of the power-amplifier or determined by later measurement (e.g., using known calibration techniques).

Assuming that two bandlimited signals, $s_1(t)$ and $s_2(t)$ with respective center frequencies $f_1$ and $f_2$ (which are not necessarily different) are to be transmitted by an M-element adaptive antenna array system, using respective downlink weight vectors $$w_1=[w_{1,1}w_{1,2} \ldots w_{1,M}]^T, \text{ and}$$

$$w_2=[w_{2,1}w_{2,2} \ldots w_{2,M}]^T.$$

Then $$z\ell_{in}=w_1,\ell_1(t)+w_2,\ell_2(t).$$

In one embodiment of the invention, it is assumed that relatively high-frequency harmonics are significantly attenuated by the RF transmit chain. The output signal from the $f$th power-amplifier is then approximated as a sum of four terms:

$$z\ell_{out}=w_1,\ \ell_1(t)+w_2,\ \ell_2(t)+b\ell w^*{}_1,\ell w^2{}_2,\ell(t)+b\ell w^2{}_1,\ell w^*{}_2,\ell b(t)$$

where a(t) and b(t) are undesired signal components with center frequencies $-f_1+2f_2$ and $2f_1-f_2$, respectively.

Therefore, the undesired signals a(t) and b(t) behave as if they are transmitted with the following spatial weight vectors:

$$\begin{aligned} x_1 &= [bW_1^*, W_2^2, tb_2 w_{1,2}^2 w_{2,2}^* \ldots b_M w_{1,M}^* w_{2,M}^2] \\ &= \text{diag}(b)\text{diag}(w_2)^2 w_1^*, \end{aligned}$$

and $$\begin{aligned} x_2 &= [bW_1^2, W_2^*, tb_2 w_{1,2}^2 w_{2,2}^* \ldots b_M w_{1,M}^2 w_{2,M}^*] \\ &= \text{diag}(b)\text{diag}(w_1)^2 w_1^*, \end{aligned}$$

respectively, where diag(y) denotes the diagonal matrix $$\text{diag}(y) = \begin{bmatrix} y_1 & & 0 \\ & \cdot & \\ & & \cdot \\ 0 & & y_M \end{bmatrix}.$$

In one embodiment of the invention, $w_1$ and $w_2$ are adjusted to change the weights $x_1$ and $x_2$ to achieve a radiation pattern that mitigates interference to co-channel or inter-channel remote user terminals and/or delivers a desirable transmit power to one or more remote user terminals.

In one embodiment of the invention used in conjunction with a time division duplex (TDD) system, an uplink covariance matrix $R_{11}$, measured on an uplink channel c that corresponds to a frequency $-f_1+2f_2$, can be used to predict the interference caused by downlink transmission on channel c. In particular, if a downlink signal is transmitted by the antenna array on channel c, and the downlink signal has a spatial weight vector $x_1$, then the expression $J=x^H{}_1R_{11}x_1$ may be used to measure to downlink interference, for example, as caused by intermodulation effects. The expression for J may be written as follows:

$$\begin{aligned} J = J^* &= x_1^T R_{II}^* x_1^* \\ &= w_1^H[\mathrm{diag}(w_2)^2\mathrm{diag}(b)R_{II}^T\mathrm{diag}(b^*)\mathrm{diag}(w_2^*)^2]w_1 \\ &= w_1^H\tilde{R}_{II}w_1, \end{aligned}$$

where $$\tilde{R}_{II}=diag(w_2)^2\ diag(b)R^T{}_{II}diag(b^*)diag(w^*{}_2)^2.$$

Using the TDD technique described above, the downlink weight vectors w, and $w_2$ may be obtained to provide a desirable level of interference mitigation toward interference sources (e.g., intermodulation effects, one or more remote user terminals on the primary or other channels, etc.), while providing a desirable transmit power to a desired remote user terminal. As such, $w_2$ may be obtained using a known method, such as the regularized least squares method described above. Then, w, may be determined using an uplink weight obtained vis-à-vis a least-squares method, such as $w_1=R^{-1}{}_{ZZ}R_{Zs}$, where Z is a matrix of receive signal snapshots and s is a reference signal vector. The cost term J may be incorporated into the calculation of $w_1$ by adding $\tilde{R}_{11}$ (or a scaled version thereof) to the covariance matrix $R_{ZZ}$, such that:

$$w_1=(R_{ZZ}+\tilde{R}_{11})^{-1}R_{Zs}.$$

Alternative Embodiments

It will be appreciated that each of the elements depicted in the Figures and described above may be implemented in hardware, software, or a combination thereof. For example, in one embodiment, a processor (e.g., a digital signal processor, general purpose microprocessor, FPGA, ASIC, a combination thereof, etc.) that is configured to execute one or more routines to cause an offset between uplink signals associated with multiple remote user terminals and also to distinguish the remote user of interest based on such offset. In addition or in lieu thereof, delay circuitry, such as tapped delay line, may be used to delay downlink signals to relative to each other and thereby cause a relative offset between uplink signals. It should be appreciated that the invention may be employed exclusively in software, in one embodiment, to include a software module for causing offsets between uplink signal transmissions, and another software module to distinguish the uplink signals based on the relative offsets that caused therebetween. Such software modules may be stored in a data storage medium accessible by execution circuitry, such as one or more general purpose or digital signal processors or other data processing device(s). Therefore, it should be appreciated that the method of the present invention, and the elements shown in the Figures and described herein, may be implemented by hardware (e.g., circuitry), software, or a combination of hardware and software.

Although the invention has been described with reference to several embodiments, it will be appreciated that various alterations and modifications may be possible without departing from the spirit and scope of the invention, which is best understood by the claims that follow.

What is claimed is:

1. A method for mitigating interference caused by ghost signals generated by an antenna array system, the method comprising:

determining a non-linear characteristic of the antenna array system;

determining an effective weight of a ghost signal based on the non-linear characteristic of the antenna array system; and obtaining a downlink beamforming strategy as a function of the effective weight, the downlink beamforming strategy for transmitting a downlink signal to a receiver, wherein the downlink beamforming strategy provides an interference mitigated region at a location susceptible to interference caused by the ghost signal.

2. The method of claim 1, further comprising:

calibrating the antenna array system to determine the non-line characteristic of the antenna array system; and determining the effective weight based on the non-linear characteristic of the antenna array system.

3. The method of claim 1, further comprising:

varying the intensity of the interference mitigate region.

4. The method of claim 1, wherein the ghost signal is at least in part caused by transmitter intermodulation.

5. The method of claim 1, wherein the ghost signal affects a channel on which the downlink signal is transmitted.

6. The method of claim 1, wherein the downlink signal is transmitted on a first channel.

7. The method of claim 6, wherein the ghost signal affects second channel.

8. The method of claim 6, wherein the ghost signal further affects the first channel.

9. The method of claim 8, wherein the first channel is utilized by first remote user terminal at the location.

10. The method of claim 9, wherein the first channel is further utilized by a second remote user terminal at a different location.

11. A method for mitigating interference caused by ghost signals generated by an antenna array system, the method comprising:

obtaining a first weight for a first downlink signal;

obtaining a second weight for a second downlink signal;

determining a characteristic of a ghost sign that would result by the interaction of transmitting the first and second downlink signals; and adjusting the second weight to mitigate the ghost signal.

12. The method of claim 11, further comprising:

calibrating the antenna array system to determine a non-linear characteristic of the antenna array system; and determining the characteristic based on the non-linear characteristic of the antenna array system.

13. The method of claim 11, further comprising:

determining a non-linear characteristic of the antenna array system; and determining the characteristic based on the non-linear characteristic of the antenna array system.

14. The method of claim 11, wherein the ghost signal is at least in part by transmitter intermodulation.

15. The method of claim 11, wherein the ghost signal affects a channel on which the at least one of the firs and second downlink signals is transmitted.

16. The method of claim 11, wherein the first and second downlink signals occupy the same channel.

17. The method of claim 11, wherein the first and second downlink signals occupy different channels.

18. The method of claim 11; wherein the characteristic is determined in an interactive manner.

19. A method for reducing ghost signal interference caused by a transmitter employing an antenna array, the method comprising:

determining that transmission of at least a first downlink signal by the transmitter will produce a ghost signal;

adjusting a downlink weight corresponding to the first downlink sit to mitigate the ghost signal, wherein the downlink signal is intended for a first remote user terminal, and the signal is mitigated at a first location corresponding to the first remote user terminal, and a second location corresponding to a second remote user terminal; and transmitting the first downlink signal in accordance with the downlink weight.

20. The method of claim 19, wherein the transmitter transfers information with the firs and second user terminals utilizing the same communication channel.

21. The method of claim 20, wherein the first and second remote user terminals are distinguished by the transmitter by spatial channels.

22. The method of claim 19, wherein the transmitter utilizes a first and a second channel for communicating with the first and the second remote user terminals, respectively, wherein the first and second channels are distinct from each other.

23. The method of claim 22, wherein the first and second channels are adjacent channels with respect to each other.

24. A machine readable medium having stored thereon a set of instructions, which, when processed by a machine, cause the machine to preform a method for reducing ghost signal interference caused by a transmitter employing an antenna array, the method comprising:

determining that transmission of at last a first downlink signal by the transmitter will produce a ghost signal;

adjusting a downlink weight corresponding to the first downlink signal to mitigate the ghost signal, wherein the downlink signal is intended for a first remote user terminal, and the signal is mitigated at a first location corresponding to the first remote user terminal, and a second location corresponding to a second remote user terminal; and transmitting the first downlink signal in accordance with the downlink weight.

25. The medium of claim 24, wherein the transmitter transfers information with the first and second remote user terminals utilizing the same communication channel.

26. The medium of claim 25, wherein the first and second remote user terminals are distinguished by the transmitter by spatial channels.

27. The medium of claim 24, wherein the transmitter utilizes a first and a second channel for communicating with the first and the second remote user terminals, respectively wherein the first and second channels are distinct from each other.

28. The medium of claim 27, wherein the first and second channels are adjacent channels with respect to each other.

29. A processing circuit for use with a transmission system employing an antenna array system, combing:

an input port to receive a fist weight for a first downlink signal and a second weight for a second downlink signal;

a processing circuit responsive to the port to determine a characteristic of a ghost signal that would result by the interaction of transmitting the first and second downlink signals and adjust the second weight to mitigate the ghost signal; and an output port to transmit the first weight and the second weight to the antenna array system.

30. The processing circuit of claim 29, wherein the processing circuit comprises a spatial processor.

31. The processing circuit of claim 29, wherein the processing circuit calibrates the antenna array system to determine a non-linear characteristic of the antenna array system determines the characteristic based on the non-linear characteristic of the antenna array system.

32. The processing circuit of claim 29, wherein the processing circuit further determines an intermodulation that would occur when transmitting the first downlink signal and the second downlink signal and adjusts the second weight to correct transmitter intermodulation.

* * * * *